US011341116B2

(12) United States Patent
Pyle

(10) Patent No.: US 11,341,116 B2
(45) Date of Patent: *May 24, 2022

(54) TECHNIQUES FOR AUTOMATED DATA ANALYSIS

(71) Applicant: Ab Initio Technology LLC, Lexington, MA (US)

(72) Inventor: Hugh F. Pyle, Salem, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/185,175

(22) Filed: Nov. 9, 2018

(65) Prior Publication Data
US 2019/0251072 A1  Aug. 15, 2019

Related U.S. Application Data

(63) Continuation of application No. 14/857,691, filed on Sep. 17, 2015, now Pat. No. 10,127,264.

(51) Int. Cl.
G06F 16/00 (2019.01)
G06F 16/23 (2019.01)
(52) U.S. Cl.
CPC ................. *G06F 16/2365* (2019.01)
(58) Field of Classification Search
CPC ...... G06Q 10/10; G06Q 10/06; G06Q 10/063; G06Q 30/02; G06Q 10/0639;
(Continued)

(56) References Cited

U.S. PATENT DOCUMENTS 5,615,359 A   3/1997  Yung
5,734,886 A   3/1998  Grosse et al.
(Continued)

FOREIGN PATENT DOCUMENTS

CN   101208695 A   6/2008
CN   101438280 A   5/2009
(Continued)

OTHER PUBLICATIONS

International Search Report and Written Opinion for International Application No. PCT/US2008/058360 dated Jul. 9, 2008.
(Continued)

*Primary Examiner* — Shyue Jiunn Hwa
(74) *Attorney, Agent, or Firm* — Wolf, Greenfield & Sacks, P.C.

(57) ABSTRACT

According to some aspects, a data processing system is provided, the data processing system comprising at least one computer readable medium comprising processor-executable instructions that, when executed, cause the at least one processor to receive, through at least one user interface, input indicating a data element and one or more data quality metrics, identify, based on relationship information associated with the data element and/or the one or more data quality metrics, one or more datasets, one or more fields of the one or more datasets, and one or more data quality rules, each of the data quality rules being associated with at least one of the one or more fields, and perform an analysis of data quality of the one or more fields based at least in part on the one or more data quality rules associated with the one or more fields.

18 Claims, 7 Drawing Sheets

(58) Field of Classification Search
CPC ........... G06Q 10/067; G06Q 10/06395; G06Q 30/0201; G06Q 10/0631; G06Q 10/06313; G06Q 30/0203; G06Q 40/04; G06Q 10/0635; G06Q 10/06375; G06Q 30/0233; G06Q 40/00; G06Q 40/06; G06Q 10/06316; G06Q 10/0633; G06Q 10/0637; G06Q 30/0204; G06Q 30/0222; G06Q 30/0282; G06Q 30/0283; G06Q 30/04; G06Q 30/0601; G06Q 30/0603; G06Q 30/0631; G06Q 30/08; G06Q 40/08; G06Q 40/12; G06Q 40/123; G06Q 40/125; G06Q 50/32; G06F 16/215; G06F 16/24578; G06F 16/84; G06F 16/254; G06F 16/258; G06F 16/9577; G06F 16/284; G06F 16/5838; G06F 16/904; G06F 9/06; G06F 11/0793; G06F 11/3409; G06F 11/3452; G06F 21/52; G06F 21/6218; G06F 3/0484; G06F 9/451; G06F 11/008; G06F 11/1675; G06F 16/2365; G06F 16/22; G06F 16/25; G06F 16/358; G06F 16/367; G06F 8/10; G06F 11/079; G06F 16/24564; G06F 16/27; G06F 16/313; G06F 16/88; G06F 16/907; G06F 16/951; G06F 30/20; G06F 40/186; G06F 40/226; G06F 40/242; G06F 8/24; G06F 8/315; G06F 8/36; G06F 9/44521

See application file for complete search history.

(56) References Cited

U.S. PATENT DOCUMENTS

| | | |
|---|---|---|
| 5,832,497 A | 11/1998 | Taylor |
| 5,848,393 A | 12/1998 | Goodridge et al. |
| 5,966,072 A | 10/1999 | Stanfill et al. |
| 6,477,520 B1 | 11/2002 | Malaviya et al. |
| 6,728,879 B1 | 4/2004 | Atkinson |
| 6,782,374 B2 | 8/2004 | Nichols |
| 7,020,869 B2 | 3/2006 | Abrari et al. |
| 7,164,422 B1 | 1/2007 | Wholey, III et al. |
| 7,215,637 B1 | 5/2007 | Ferguson et al. |
| 7,401,064 B1 * | 7/2008 | Arone .................. G06F 16/25 |
| 7,461,042 B2 | 12/2008 | Long et al. |
| 7,565,642 B2 | 7/2009 | Moore et al. |
| 7,725,433 B1 * | 5/2010 | Labrie .................. G06F 16/213 |
| | | 707/612 |
| 7,756,873 B2 | 7/2010 | Gould et al. |
| 7,849,075 B2 | 12/2010 | Gould et al. |
| 7,865,507 B2 * | 1/2011 | Namait .................. G06Q 30/02 |
| | | 707/732 |
| 7,899,833 B2 | 3/2011 | Stevens et al. |
| 8,032,501 B2 | 10/2011 | Bone et al. |
| 8,064,672 B2 | 11/2011 | Narayanan et al. |
| 8,069,129 B2 | 11/2011 | Gould et al. |
| 8,073,801 B1 | 12/2011 | von Halle et al. |
| 8,078,485 B1 * | 12/2011 | Kraehmueller ...... G06Q 10/063 |
| | | 705/7.11 |
| 8,086,553 B2 | 12/2011 | Bone et al. |
| 8,122,367 B2 | 2/2012 | Krieger et al. |
| 8,190,562 B2 | 5/2012 | Sanghvi et al. |
| 8,301,413 B2 | 10/2012 | Napolin et al. |
| 8,332,740 B2 | 12/2012 | Graham |
| 8,347,207 B2 | 1/2013 | Borgsmidt et al. |
| 8,380,651 B2 | 2/2013 | Gould et al. |
| 8,386,408 B2 | 2/2013 | Gould et al. |
| 8,417,678 B2 | 4/2013 | Bone et al. |
| 8,438,533 B2 | 5/2013 | Fritsche et al. |
| 8,468,125 B2 | 6/2013 | Tarnoff et al. |
| 8,478,706 B2 | 7/2013 | Gould et al. |
| 8,571,317 B2 | 10/2013 | Welling et al. |
| 8,612,404 B2 | 12/2013 | Bone et al. |
| 8,645,434 B2 | 2/2014 | Carter et al. |
| 8,725,660 B2 | 5/2014 | Forman et al. |
| 8,897,563 B1 | 11/2014 | Welling et al. |
| 8,898,101 B2 | 11/2014 | Bone et al. |
| 10,127,264 B1 | 11/2018 | Pyle |
| 2002/0049777 A1 | 4/2002 | Terayama et al. |
| 2002/0103834 A1 * | 8/2002 | Thompson ............... G06K 9/03 |
| | | 715/256 |
| 2003/0120593 A1 | 6/2003 | Bansal et al. |
| 2004/0034848 A1 | 2/2004 | Moore et al. |
| 2004/0054661 A1 * | 3/2004 | Cheung ................. G06F 16/951 |
| 2004/0085357 A1 | 5/2004 | Childress et al. |
| 2004/0088196 A1 | 5/2004 | Childress et al. |
| 2004/0210661 A1 | 10/2004 | Thompson |
| 2005/0038764 A1 | 2/2005 | Minsky et al. |
| 2005/0086360 A1 | 4/2005 | Mamou et al. |
| 2005/0246686 A1 | 11/2005 | Seshadri et al. |
| 2006/0095466 A1 | 5/2006 | Stevens et al. |
| 2006/0095832 A1 | 5/2006 | Serra et al. |
| 2006/0112061 A1 | 5/2006 | Masurkar |
| 2006/0256014 A1 | 11/2006 | Sengupta et al. |
| 2006/0294150 A1 | 12/2006 | Stanfill et al. |
| 2007/0021995 A1 | 1/2007 | Toklu et al. |
| 2007/0050340 A1 | 3/2007 | von Kaenel et al. |
| 2007/0255741 A1 * | 11/2007 | Geiger ............. G06F 16/24573 |
| 2008/0059436 A1 | 3/2008 | Crocker |
| 2008/0140602 A1 | 6/2008 | Roth et al. |
| 2008/0256014 A1 | 10/2008 | Gould et al. |
| 2008/0301155 A1 | 12/2008 | Borgsmidt |
| 2009/0012983 A1 * | 1/2009 | Senneville ............ G06F 16/256 |
| 2009/0319832 A1 | 12/2009 | Zhang |
| 2012/0059784 A1 | 3/2012 | Gould et al. |
| 2012/0066549 A1 | 3/2012 | Gould et al. |
| 2015/0019303 A1 * | 1/2015 | Rao .................. G06Q 10/06395 |
| | | 705/7.41 |
| 2015/0339607 A1 | 11/2015 | Nielsen |
| 2016/0070725 A1 * | 3/2016 | Marrelli .................. G06F 16/84 |
| | | 707/692 |
| 2016/0162825 A1 * | 6/2016 | Dan ................. G06Q 10/06316 |
| | | 705/7.37 |

FOREIGN PATENT DOCUMENTS

| | | |
|---|---|---|
| JP | H01-277939 A | 11/1989 |
| JP | H02-275539 A | 11/1990 |
| JP | 04-352029 A | 12/1992 |
| JP | 2003-208307 A | 7/2003 |
| WO | WO 01/86592 A2 | 11/2001 |

OTHER PUBLICATIONS

International Search Report and Written Opinion for International Application No. PCT/US09/49299 dated Aug. 12, 2009.
International Search Report and Written Opinion for International Application No. PCT/US10/22593 dated Mar. 12, 2010.
International Search Report and Written Opinion for Interantional Application No. PCT/US2014/057336 dated May 28, 2015.
"ILog JRules: Leading the Way in Business Rule Management Systems," White Paper. ILog Business Rules, Mar. 2005, 15 pages.
Affidavit Pursuant to 37 CFR 1.56 signed by Craig W. Stanfill on Sep. 23, 2009, 2 pages.
Barakat, Nahla and Andrew P.Bradley, "Rule Extraction from Support Vector Machines: Measuring the Explanation Capability Using the Area under the ROC Curve," A.P. Pattern Recognition, pp. 8112-8815 (2006).
Hamaneh et al., "Automated Removal of EKG Artifact From EEG Data Using Independent Component Analysis and Continuous Wavelet Transformation," IEEE Transactions on Biomedical Engineering, vol. 61, No. 6, pp. 1634-1641 (2014).
Icke, Ilknur and Andrew Rosenberg, "Automated Measures for Interpretable Dimensionality Reduction for Visual Classification: A User Study," Visual Analytics Science and Technology (VAST), pp. 281-282 (2011).
ILOG JRules Performance Analysis and Capacity Planning, ILOG Business Rules Product Management, Version 1.0, Sep. 2005, 16 pages.

(56) References Cited

OTHER PUBLICATIONS

ILOG, "Enrich the Decisioning of Your COBOL Applications," Jun. 2008, pp. 3-8.

Korel et al., "Data Dependence Based Testability Transformation in Automated Test Generation," Software Reliability Engineering, 2005, ISSRE 2005, 16th IEEE International Symposium on DOI, 10 pages (2005).

Liu et al., "A Vector Operation Based Fast Association Rules Mining Algorithm," Bioinformatics, System Biology and Intelligent Computing, pp. 561-564 (2009).

Mukhopadhyay et al., "A Product Recommendation System using Vector Space Model and Association Rule", Rana Information Technology, pp. 279-282 (2008).

Owen, James. "Clash of the Java rule Titans," Info World <http://www.infoworld.com>, Jul. 17, 2006, 4 pages.

Saqib et al., "Automated Optimization of Data-Path Design by Improving Circuit Area and Critical Time through Adaptive Transformation," Intelligent System and Design Applications, pp. 1493-1498 (2010).

Zhang et al., A New Association Rules Mining Algorithm Based on Vector, Genetic and Evolutionary Computing, pp. 429-432 (2009).

\* cited by examiner

|  | Validation Rule 1 | Validation Rule 2 | Validation Rule 3 |
|---|---|---|---|
| Data Field 1 | Rule Expression | Rule Expression |  |
| Data Field 2 | Rule Expression |  |  |
| Data Field 3 |  |  |  |
| Data Field 4 | Rule Expression | Rule Expression | Rule Expression |

FIG. 5

TECHNIQUES FOR AUTOMATED DATA ANALYSIS

CROSS-REFERENCE TO RELATED APPLICATIONS

This application is a continuation and claims the benefit under 35 U.S.C. § 120 of U.S. application Ser. No. 14/857,691, filed on Sep. 17, 2015, entitled "TECHNIQUES FOR AUTOMATED DATA ANALYSIS," now U.S. Pat. No. 10,127,264. The contents of this application are incorporated herein by reference in their entirety.

BACKGROUND

Organizations that rely on large amounts of data have a need for that data to have a high level of quality. 'Quality' as it pertains to data refers to the extent to which data values exhibit characteristics such as accuracy, precision, completeness, integrity, consistency, etc. In some cases, low data quality can lead to negative practical effects on the organization, such as records being handled incorrectly, inaccurate data being provided to members of the organization, inefficient system operation, system failures, etc. For a business organization, such effects can quickly lead to customer dissatisfaction.

For very large datasets, automated systems have been developed to evaluate data quality for those datasets and to identify and report on incidences of low data quality. Corrective measures may then be taken to improve the data quality of a dataset so identified, such as by reprogramming the system that produces the dataset to favorably adjust the content of the dataset. Typically, organizations such as businesses have such a large volume of data that it is not practical for human operators to evaluate data quality of the data, and consequently a data quality engine may be developed that can automatically measure data quality and ensure the data is meeting the needs of the organization.

A data quality engine may measure data quality for a dataset by examining values of data fields (also referred to simply as "fields") of the dataset using predefined data quality rules. The data quality rules may define criteria for evaluating values of fields, such as by identifying characteristics (e.g., accuracy, precision, etc.) of the values according to the criteria. The extent to which the values exhibit these characteristics may thereby produce a measure of data quality for the fields. By evaluating the data quality rules for data fields, therefore, a data quality engine may automatically produce a measure of data quality. In some cases, the data quality engine may evaluate the data quality of a single record that comprises values with multiple data fields by evaluating data quality rules for one or more of the data field values in the record. In some cases, the data quality engine may evaluate the data quality of a dataset as a whole by combining data quality measures produced by evaluating data quality rules for each of the fields of the dataset.

SUMMARY

According to some aspects, a data processing system is provided comprising at least one processor, at least one user interface, and at least one computer readable medium comprising processor-executable instructions that, when executed, cause the at least one processor to receive, through the at least one user interface, input indicating a data element and one or more data quality metrics, identify, based on relationship information associated with the data element and/or the one or more data quality metrics one or more datasets, one or more fields of the one or more datasets, and one or more data quality rules, each of the data quality rules being associated with at least one of the one or more fields, perform an analysis of data quality of the one or more fields based at least in part on the one or more data quality rules associated with the one or more fields, and provide results of the data quality analysis, the results comprising a measure of data quality determined for the data element and a first data quality metric of the one or more data quality metrics.

According to some aspects, a data processing system is provided comprising at least one processor, at least one user interface, and at least one computer readable medium comprising a metadata repository identifying one or more datasets and one or more fields of the one or more datasets, and processor-executable instructions that, when executed, cause the at least one processor to receive, through the at least one user interface, input describing a data element and one or more data quality metrics, record, in the metadata repository, the data element and the one or more data quality metrics, receive, through the at least one user interface, input that describes one or more data quality rules, record, in the metadata repository, the one or more data quality rules and relationship information defining an association between a first data quality rule of the one or more data quality rules and at least one of the one or more fields, and record, in the metadata repository, relationship information defining an association between the first data quality rule and at least one of the one or more data quality metrics.

According to some aspects, a method of operating a data processing system is provided, the data processing system being executed by a computing system coupled to at least one computer readable medium, the method comprising receiving, through at least one user interface of the data processing system, input indicating a data element and one or more data quality metrics, identifying, by the data processing system based on relationship information associated with the data element and/or the one or more data quality metrics one or more datasets, one or more fields of the one or more datasets, and one or more data quality rules, each of the data quality rules being associated with at least one of the one or more fields, performing, by the data processing system, an analysis of data quality of the one or more fields based at least in part on the one or more data quality rules associated with the one or more fields, and providing results of the data quality analysis, the results comprising a measure of data quality determined for the data element and a first data quality metric of the one or more data quality metrics.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 5 depicts an illustrative user interface for defining quality data rules, according to some embodiments.

DETAILED DESCRIPTION

Figure 1:
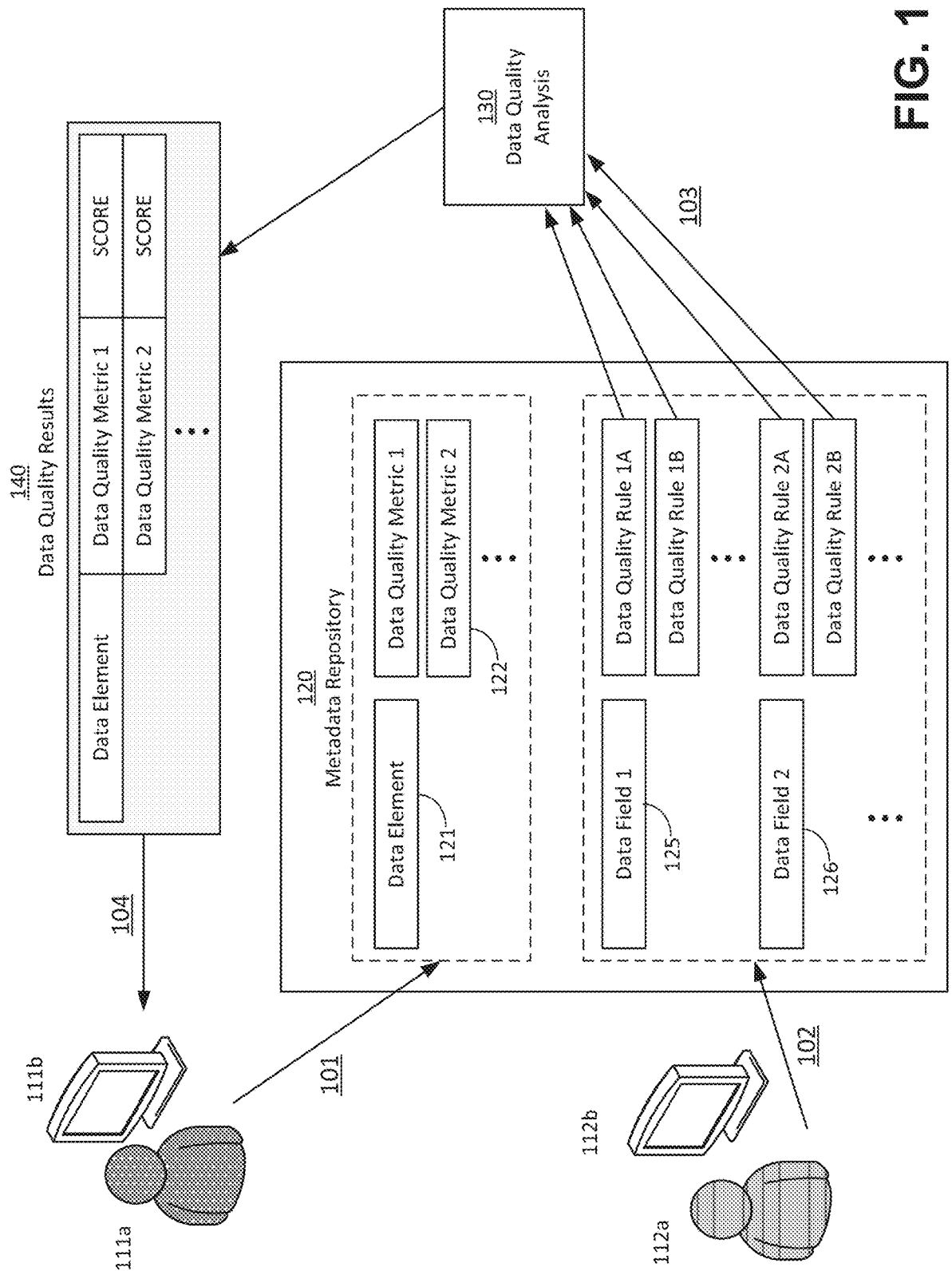
FIG. 1 illustrates a process for configuring a data processing system and performing automated data quality analysis, according to some embodiments.

The inventors have recognized and appreciated that accuracy and efficiency of a data processing system may be improved by techniques that enable automated data quality analysis. In accordance with some embodiments, the data processing system may be configured to allow specification of natural language data quality requirements. Conventionally, a person knowledgeable about the business of an organization—but not the mechanics of programming rules for a data quality engine—defines data quality requirements based on data quality needs of the organization. A technical user may, based on these requirements, create technical data quality rules within a data quality engine of the data processing system that reflect these requirements. The created data quality rules may then be executed when the data quality engine performs a data quality analysis.

The inventors have recognized and appreciated, however, that a data quality engine thus configured provides limited utility to non-technical users due to the expertise necessary to access data quality rules and to perform data quality analysis based upon them. Improvements to a data processing system described herein provide functionality that allows different users, who may have different skill sets, to specify data quality requirements and data quality rules, and to perform data quality analysis using the data quality engine. In particular, the data processing system may store data quality requirements in a format understandable by a non-technical user. These requirements may be associated with rules, prepared by a technical user. Those rules may be invoked by the non-technical user using language of the business data requirements familiar to that user.

Results of executing those rules may be presented to the non-technical user in terms of data quality based on data requirements of the organization. In some embodiments, this functionality may be provided through the use of a metadata repository that stores objects of different types and relationships between these objects. Such relationships may be represented by information stored within the repository that defines a relationship, such as a pointer, a link, etc. A metadata repository may enable the data processing system to associate objects used by technical users with related objects used by non-technical users, thereby allowing technical and non-technical users to work together when configuring and performing data quality analysis using a data quality engine.

For example, a user familiar with data quality requirements of a business may identify "data elements" that represent conceptual quantities having relevance to the business. A data quality engine as described herein may receive input specifying these data elements using natural language familiar to the business user. A skilled programmer may then utilize tools of the data quality engine to identify fields within datasets that correspond to the data element, and may programmatically define data quality rules for those fields within the data quality engine. In doing so, the programmer may create associations within the data quality engine between the data elements defined by the business user and the datasets, fields, and/or data quality rules created by the programmer. The tools used by the programmer to create such associations may provide some level of automation, such as by the programmer providing input to a suitable user interface, thereby instructing one or more programs to create an association.

In some cases, data elements may be associated with data quality requirements. A data processing system as described herein may receive input from a business user specifying data quality requirements (also referred to as data quality "metrics") using natural language. The data quality engine may store associations between the data quality metrics and data elements previously defined in the data quality engine, which may be based on user input. In such cases, the programmer may programmatically define data quality rules based additionally on the natural language specification of these data quality metrics provided by the business user. In doing so, the programmer may create associations within the data quality engine between the data quality metrics and the data quality rules.

To aid the business analyst in interactions with the data quality engine, a user interface may be provided that interfaces with the data quality engine and allows selection of data elements (e.g., that represent business concepts) and natural language specification of data quality metrics for the data elements. In some embodiments, data elements may be organized in a hierarchy of data elements that embody important or critical aspects of the business's data. A user interface of the data quality engine may also allow the business analyst to initiate and view results of data quality analyses by accessing the data quality metrics and data elements specified through natural language.

Accordingly, while the business analyst may simply access aspects of data quality requirements specified within the data quality engine using natural language, the system may perform complex technical tasks by exploiting these associations. The data quality engine may be configured to translate requests from a business user specified via natural language into these complex technical tasks.

In some cases, the data quality engine may identify a plurality of data quality rules to be evaluated for one or more datasets based on input provided by a business analysis through a user interface of the data quality engine. Since associations between objects specified via natural language (e.g., data elements, data quality metrics) and objects defined by a technical user (e.g., data quality rules, fields of datasets) may be created when these objects are defined, the data quality engine may access these recorded associations to translate a non-technical request into a sequence of technical actions (e.g., analyze a dataset using identified data quality rules) to be performed. Similarly, results of such technical actions may be translated by the data quality engine into a format geared towards the needs of the less technical analyst user, and presented as such via a user interface of the data quality engine.

Data quality analysis of a dataset may be performed by any user, including the programmer and/or business analyst, once the data element has been associated with one or more fields, which have in turn been associated with one or more data quality rules. The analysis may thereby be performed in any of numerous ways. In a first illustrative approach, the data quality engine may present a user interface in which a dataset and one of the data elements associated with the dataset are selected. The data quality engine may then perform data quality analysis for any fields of the dataset associated with the selected data element that have associated data quality rules. In a second illustrative approach, the data quality engine may present a user interface in which a dataset and a data quality metric are selected. The data quality engine may then perform data quality analysis for data elements that are associated with the selected data quality metric, by analyzing fields of the dataset associated with the selected data element that have associated data quality rules. With either approach, the data quality engine may perform data analysis based on input from a user not having technical knowledge of underlying business processes, such as the business analyst.

According to some embodiments, the data quality engine may define a checkpoint that identifies one or more datasets. A user (e.g., a technical user) may select the one or more datasets through an interface of the data processing system to define the checkpoint. In some cases, a checkpoint may represent a particular step within business processes, such as the input or output of a particular business processing stage. Such a checkpoint may be defined within the data quality engine such that it can produce data quality analysis for the group of datasets associated with the checkpoint. The datasets may have one or more fields that have been associated with data elements via the above-described process. Accordingly, data quality analysis for a defined checkpoint may be performed.

A data quality analysis may be made by the data quality engine at a checkpoint by performing data quality analysis of each of the fields of the checkpointed datasets via the fields' associated data elements. In this way, a data quality analysis may be made at various points in a complex set of business processes and may, if desired, be monitored over time. Since this data quality analysis is performed by the data quality engine based on data elements, and not purely on aspects that require a technical knowledge of the business processes, a user such as a business analyst may readily understand the data quality analysis results generated for the checkpoint.

Following below are more detailed descriptions of various concepts related to, and embodiments of, techniques that enable automated data quality analysis. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates a process for configuring and performing automated data quality analysis, according to some embodiments. The process illustrated in FIG. 1 may be performed by any suitable data processing system that includes a data quality engine and a metadata repository. In the illustrated process, a first user 111*a* creates a data element and data quality metrics (act 101), a second user 112*a* creates data quality rules associated with the data element and data quality metrics (act 102), a data quality analysis is performed (act 103), and data quality results are generated and presented (act 104).

As discussed above, a data quality engine as described herein may allow a less technical user, such as a business analyst, to define data elements and data quality metrics that have meaning to the business and a more technical user, such as a programmer, to define data quality rules based on these data elements and data quality metrics. Accordingly, in some cases, user 111*a* may be an analyst or other business user, whereas user 112*a* may be a programmer or other technical user.

In the example of FIG. 1, objects are defined and stored within metadata repository 120. As used herein, a "metadata repository" refers to a databased configured to store information about data structures. For instance, a metadata repository may be configured to store different types of data objects in addition to relationship information for those data objects, which may include relational links between objects of the same or different types. Metadata repositories are described in further detail in, for example, U.S. Pat. No. 7,899,833, titled "Managing Related Data Objects," which is hereby incorporated by reference in its entirety. In the example of FIG. 1, a metadata repository may store a data element and a data quality metric in addition to a relational link between the data element and the data quality metric. Objects and/or links between objects may be described using any suitable formal language, such as by using one or more schema. Illustrative relationships between the objects depicted as stored within the metadata repository 120 in the example of FIG. 1 are discussed below in relation to FIG. 2A.

In the example of FIG. 1, a user 111*a* may create a data element, such as data element 121, within metadata repository 120. In some cases, the data element may be a business term and may have a name that is specified via natural language. As used herein, a "natural language" specification refers to textual data that is generally not bound by typical programmatic rules of syntax such that a wide range of words, phrases, symbols, etc. may be used to specify a name using natural language. For instance, many programming languages prohibit the specification of parameter names that include spaces, whereas a particular natural language specification may accept spaces as valid character input. Accordingly, a data element may be named using a business term such as "Account Number," "Business Phone No.," "Reward Points" or "Manager/Officer Name." In some cases, a data element may be created by a user accessing a user interface that provides access to objects within metadata repository. Accordingly, the user 111*a* may access the user interface and provide attributes of a new data element (e.g., by typing manually and/or importing data from a file) to create the data element.

According to some embodiments, a data element such as data element 121 stored in metadata repository 120 may be stored within a hierarchy of data elements. For example, the data element may have an attribute indicating a position in a predefined hierarchy such as a parent data element or a named location within a tree of elements that contain data elements. Data elements as stored within the metadata repository may also be associated with any number of other attributes, such as a text description, date created and/or modified, etc. Any attributes associated with a data element may be provided during or after creation of the data element and/or may be modified subsequent to the creation.

According to some embodiments, user 111*a* may create one or more data quality metrics, of which data quality metric 122 shown in FIG. 1 is an illustrative example. A data quality metric may have a name specified via natural language, and may be named so as to be related to a type of data quality requirement. For example, data quality metrics named "Accuracy," "Completeness," or "Validity" may be created. As with the data elements, a user may access a suitable user interface to create and/or manage data quality metrics, which may be the same or a different user interface from that used to manage data elements.

According to some embodiments, a data element may be associated with one or more data quality metrics, such as via relational links between objects in the metadata repository 120. Such an association may be created when the data element is created or otherwise, and may include a description that provides details of the association. For example, where an association is created between a data element named "Account Number" and a data quality metric named "Validity," the association may include a description of "ensure account numbers conform to US and European account number formats." In some cases, this description may provide guidance to a user that creates data quality rules based upon the association between the data element and the data quality metric, as discussed further below.

The data element and data quality metric objects created and/or managed by, for example, user 111*a*, may accordingly in some cases include only "non-technical" information in that they may be defined to have names that have a purely business meaning and have attributes (including their name) that have little or no restrictions as to how information is entered. Thus, a non-specialized user may easily create and manage data elements and data quality metrics without complex programming being necessary.

Data fields, such as data fields 125 and 126, may be selected by user 112*a* based on an identified data element. An association between an identified data element and one or more data fields may then be created (e.g., by creating relational links within the metadata repository 120). For example, user 112*a* may note that a data element called "Business Phone Number" has been created and may identify one or more data fields of one or more datasets that are used to store a business phone number. In practice, such fields may have names that indicate or suggest the type of data they store (e.g., a filed named "biz-phone") but may sometimes be named in such a way that only a user familiar with the architecture of the data processing system will recognize the field as being related to the data element in question (e.g., a field named "BD_offcphn"). In either case, user 112*a* may create the association between the data element and the data field such that a "less technical" object, namely the data element, is now associated with a "more technical" object, namely the data field.

Accordingly, since a less technical user 111*a* may create a labeled data element indicating the aspect of the business he/she is interested in analyzing and the more technical user 112*a* may associate that data element with data fields known to relate to this aspect, in effect the less technical user may be provided with access to more technical aspects of the data processing system via the natural language specified data element. The less technical user may then access automated features of the data processing system to perform tasks that would otherwise usually require a higher level of technical skill. For instance, a less technical user may access a user interface that provides a function that, when activated, initiates an automated task such as performing data quality analysis. A complex automated task such as a data quality analysis may be initiated by a non-technical user performing a sequence of simple, comprehensible steps, since elements of the user interface (e.g., a data element) are associated with other objects such as data fields and data quality rules.

According to some embodiments, user 112*a* may create data quality rules. The user 112*a* may create data quality rules in any suitable way, including by accessing a user interface of the data quality engine, which may or may not be the same user interface with which user 111*a* created the data element and/or data quality metrics, as discussed above. For example, data quality rules may be defined by writing code either directly (e.g., in a text editor) or indirectly (e.g., by accessing a user interface that provides for definition of data quality rules and that generates code as a result).

User 112*a* may create data quality rules that each evaluate the data quality of a data field based upon one or more data quality metrics that are associated with the data field. The aspects of data quality evaluated by the created data quality rules may be selected by the user based on the presented name and/or details provided for a given data quality metric. For example, a data element named "Account Number" may be associated with a data field named "acct_num" and a data quality metric called "Validity." User 112*a* may, based on the names of the data element and the data quality metric, then write one or more data quality rules that evaluate the validity of the data field "acct_num." These data quality rules may become associated with the data field, the data quality metric and/or the data element, either due to manual operations performed by a user and/or by automatic association performed by the data quality engine during creation of the data quality rules. In some cases, evaluating data quality may utilize values of multiple data fields, examples of which are discussed further below.

A data quality rule may be associated with a data field (e.g., via relational links stored within the metadata repository). Such an association may be created manually (e.g., by specifying the rule and the field within a suitable user interface) and/or may be created automatically (e.g., by the data processing system identifying data fields examined by the data quality rule and automatically creating associations between those fields and the rule).

According to some embodiments, a data quality rule may indicate how to determine whether a value within a data field fails or passes the rule. The rule may include any suitable logical expression such that, when the data processing system evaluates the rule upon a value in the data field, the system produces an indication of whether the value passed or failed. For example, a data field that stores an account number may have an associated data quality rule that generates a pass condition when a value in the field has 10 digits and starts with a "1," and generates a failure condition otherwise. When performing a data quality analysis, the data processing system may independently evaluate the value in a data field in each record of a dataset to determine how many of the values pass the data quality rule, and how many fail the rule.

According to some embodiments, a data quality rule may examine values of data fields other than an associated data field to determine whether a value within the associated data field fails or passes the rule. The data quality rule may therefore, in some cases, perform branching logic based on values of other data fields. For example, a data quality rule evaluated against a first data field may evaluate the first data field in one way when a second data field has one value and in a different way when the second data field has a different value. As one example, when a first data field has the value "A," a data quality rule may generate a pass for values in a second data field (with which the rule is associated) only when the value begins with a "1," whereas when the first data field has the value "Z," the data quality rule may generate a pass for values in the second data field only when the value begins with a "9."

According to some embodiments, a data quality rule associated with a first data field may produce an indication of a pass or failure of the rule associated with a data field other than the first field. Thus, evaluation of a field may be decoupled from a determination of whether a field produces passes or fails a rule. This may be useful in cases where a data quality rule is written to have logic that determines the root cause of a data quality problem.

For example, in a dataset comprising an "account_number" data field and a "country" data field, the correct value of "account_number" may depend on which country is represented by the value of "country" (e.g., a U.S. account number may have a different format than a U.K. account number). The "account_number" field may be associated with a data quality rule that checks the validity of its values based on the value of the "country" field's value. In cases where the value of "account_number" is a valid account number for one country, yet the value of "country" does not match this country, it may be desirable to register a failure of the "country" field rather than the "account_number" field. In other words, in such cases the data quality failure is more likely to be due to an incorrect value of "country" rather than an incorrect value of "account_number." Accordingly, the data quality rule may be programmed to examine both fields and determine which field to register as failing the rule in addition to whether there is a pass or failure. In other cases, the data quality rules may produce an indication of failure that is associated with the "account_number" field.

According to some embodiments, a data quality rule may be configured such that, when a value of a data field fails the rule, one or more error codes are produced. A single data quality rule may be configured to produce a pass or a failure represented by one of multiple error codes. That is, a rule may have multiple modes of failure (e.g., validity failed due to incorrect length, validity failed due to incorrect starting digit, etc.). Error codes may be mapped to a data quality metric such that multiple error codes are associated with a single data quality metric. Thus, while a failure to pass a data quality rule may be recorded in one instance as having failed a particular data quality metric, each failure may be recorded in the same instance as also having a finer grained type of failure.

In act 103 shown in FIG. 1, a data processing system performs a data quality analysis. In some cases, user 111a may initiate the data quality analysis by providing input to the data quality system indicating how the analysis is to be performed in terms of defined data elements and/or data quality metrics. The user may additionally specify one or more physical datasets that will be examined during the data quality analysis. While a logical description of a dataset may be stored in metadata repository 120, the data values themselves may not be. Accordingly, initiation of a data quality analysis may comprise selection of a dataset stored on a computer readable medium that matches the format of the logical dataset stored in the metadata repository.

According to some embodiments, a data quality analysis may be performed in an automated fashion by running a script or other code that performs a preselected data quality analysis on a dataset. The data processing system may schedule performance of such automated data quality analysis at a designated date and/or time. A parameterized definition of the dataset's location may be used in some cases such that a different dataset may be evaluated each time the automated script or program is executed. For example, a business process may produce a dataset once per day with a known filename (e.g., the filename may include the date in a "DDMMYYYY" format). A script or other process may then automatically perform the same data quality analysis on the present day's dataset, once per day. In this way, the data quality engine may measure data quality of the dataset over time.

According to some embodiments, a data quality analysis may be initiated based on selection of a dataset description, one or more data files stored on a computer readable medium that match the dataset description, and a data quality metric. Any data quality rules associated with data fields of the dataset and with the data quality metric may be identified (e.g., via following relational links between these objects within the metadata repository), and the data quality rules may be evaluated on the fields of the dataset with which the rules are associated.

According to some embodiments, the data quality engine may initiate a data quality analysis based on selection of a dataset description and one or more data files stored on a computer readable medium that match the dataset description. The engine may identify any data elements and data quality metrics associated with data fields of the dataset in addition to data quality rules associated with the data fields. The engine may then evaluate the data quality rules on the fields of the dataset with which the rules are associated.

According to some embodiments, the data quality engine may initiate a data quality analysis based on selection of a checkpoint. As discussed above, a checkpoint may represent a particular step within business processes, such as the input or output of a particular business processing stage. The metadata repository 120 may define a checkpoint as encompassing a plurality of datasets. These datasets may each be associated with one or more data elements, data quality metrics and/or data quality rules. Accordingly, the data quality engine may initiate a data quality analysis by selecting a checkpoint, thereby identifying these data quality rules.

Results of a data quality analysis may be processed and quantified in any of numerous ways. As one illustrative example of producing data quality results, the following procedure may be followed. The data quality engine may evaluate each data quality rule for associated data fields for each record of a dataset. When a value fails a rule, the data quality engine flags the record including the value that produced the failure as having produced an error. The data quality engine may count each record as producing at most one error, even if multiple values within the record fail multiple data quality rules. The number of errors counted is then totaled and compared with the total number of records, thereby producing a percentage of the records evaluated that produced at least one failure. Thus, a measure of data quality for a dataset may be determined.

As another illustrative example, the data quality engine may identify data quality rules that are associated with a particular data element and a data quality metric associated with that data element. The data quality rules may evaluate any number of data fields of any number of datasets. Irrespective of how many data fields and datasets the data quality engine evaluates, the data quality engine may evaluate the data quality rules based solely on the data fields of each of the identified datasets to determine how many of the values within those data fields pass or fail the associated data quality rule(s). The number of passes may be determined as a fraction of the total number of data values evaluated. It will be appreciated that this approach, as well as the previously described approach to quantifying data quality results, are merely two illustrative approaches and other equally suitable approaches may also be employed.

In act 104, the data processing system presents data quality results. In some cases, the system presents results to user 111a in response to the user initiating a data quality analysis. In some cases, results of a data quality analysis may be stored in the metadata repository 120 and subsequently viewed through a user interface by user 111a or other user(s).

Presentation of the data quality results may depend on how the results were tabulated in act 103. In the example of FIG. 1, the data processing system presents data quality results for evaluation of a data element and two associated data quality metrics. The value of "SCORE" may be, for example, a fraction of data values passing the data quality rules as described above. In some cases, the score may simply indicate a level of quality by comparing such a fraction to one or more threshold values (e.g., a fraction over 0.95 is represented by "PASS," whereas a lower fraction is represented by "FAIL").

In the example of FIG. 1, user 111a initiated a data quality analysis for a data element 121 associated with data quality metrics 122, and the analysis produced a score for each of these metrics in act 104. Such scores may be presented to user 111a through a user interface that presents less technical aspects of the above-described process to the user. For instance, where user 111a is an analyst or other business user, such a user interface may expose functions allowing the user to define data elements and data quality metrics, to describe data quality requirements, to initiate a data quality analysis, and to view results of the data quality analysis. Such functions may accordingly be provided in a less technical manner suitable for the business user, allowing the business user to perform complex data quality analyses in an automated fashion by interacting with a less technical user interface.

In some cases, a technical user may be presented with a different user interface within the same data processing system through which the technical user may view data elements, data quality metrics and data quality requirements entered by another user (e.g., a business user) and through which the technical user may create data quality rules. This is merely one example, however, as in general any number of different user interfaces within the same data processing system may be defined such that different users have different functionality of the system exposed through their respective user interface(s).

Figure 2A:
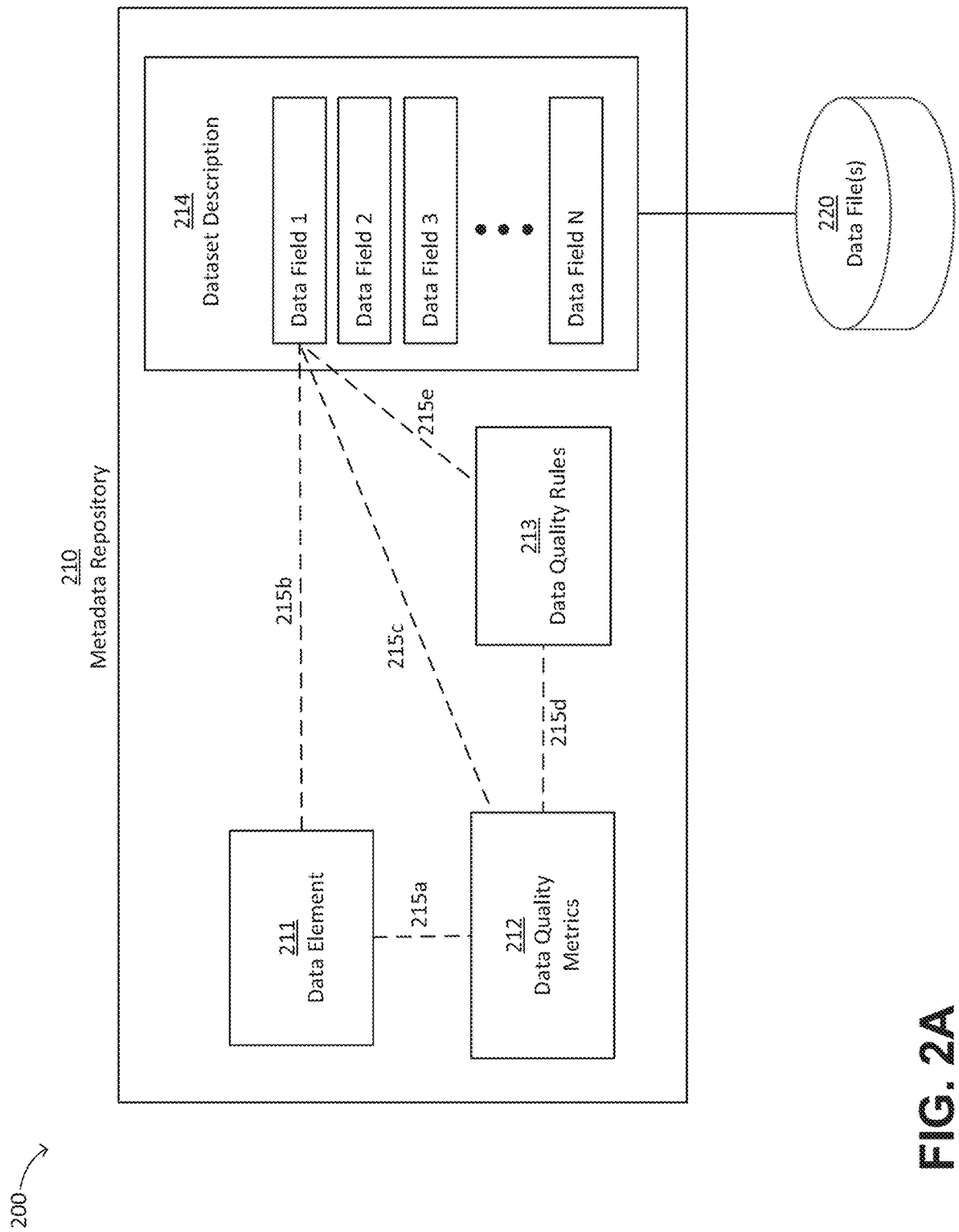
FIG. 2A depicts a block diagram of a metadata repository storing objects relating to automated data quality analysis, according to some embodiments.

FIG. 2A depicts a block diagram of a metadata repository storing objects relating to automated data quality analysis, according to some embodiments. As discussed above, a metadata repository may store one or more data elements, data quality metrics, data quality rules and logical descriptions of dataset objects. Metadata repository 210 includes these aforementioned objects and stores associations between certain objects. In the example of FIG. 2A, associations between object types that may be associated with one another are denoted by dashed lines 215a-215e.

A data element 211 may be associated with one or more data quality metrics 212 via relationship 215a. These data quality metrics may also be associated with other data elements. For example, the metadata repository may define data quality metrics named "Accuracy" and "Validity." A first data element may be associated with only the "Accuracy" data quality metric, whereas a second data element may be associated with both the "Accuracy" and "Validity" data quality metrics.

A data element 211 may be associated with one or more data fields, of which "Data Field 1" in dataset description 214 is but one example, via relationship 215b. A single data element may be associated with multiple data fields in a single dataset description, with a single data field in each of multiple dataset descriptions, or multiple data fields in multiple dataset descriptions. As discussed above, a programmer or other technical user may have identified these data fields as relating to or otherwise corresponding to the data element in question.

A data field within a dataset description may be associated with one or more data quality metrics via relationship 215c. A single data quality metric may similarly be associated with one or more data fields. For example, the metadata repository may store definitions of data quality metrics named "Accuracy" and "Validity." A first data field may be associated with only the "Accuracy" data quality metric, whereas a second data field may be associated with both the "Accuracy" and "Validity" data quality metrics.

A data quality metric may be associated with one or more data quality rules 213, whereas a data quality rule is associated with a single data quality metric via relationship 215d. In the example of FIG. 2A, a data quality rule is associated with a single data field as a one-to-one mapping via relationship 215e. However, as discussed above, a data quality rule may in general be associated with one or more fields. The example of FIG. 2A illustrates a case where data quality rules are associated with a single data field of a dataset merely for simplicity of illustration, and it will be appreciated that any of data quality rules 213 may in general be associated with any number of data fields of any number of datasets.

Illustrative dataset description 214 may include data describing one or more data files 220. The data may, for instance, describe the format of the data (e.g., how to parse the data into the data fields) and/or how to access the data files (e.g., by location and/or address). For example, the dataset description may define a record format that can parse the data file(s) into records of the dataset. In the example of FIG. 2A, data file(s) 220 are shown as stored separately from the metadata repository 210, and may be stored on any suitable computer readable medium or media. In some cases, a data file may be accessed based on a location of a data file (e.g., a file path) stored within the dataset description. In some cases, this location may be parameterized such that the value of the location dynamically resolves to a location of a data file at runtime.

Relationships 215a-215e may be stored in the metadata repository in any suitable way. In some cases, objects stored in the repository may be stored with unique identification values and relationships between objects may be represented within an object by references to the identification values of related objects. However, any suitable storage technique may be implemented to store above-described relationships.

Figure 2B:
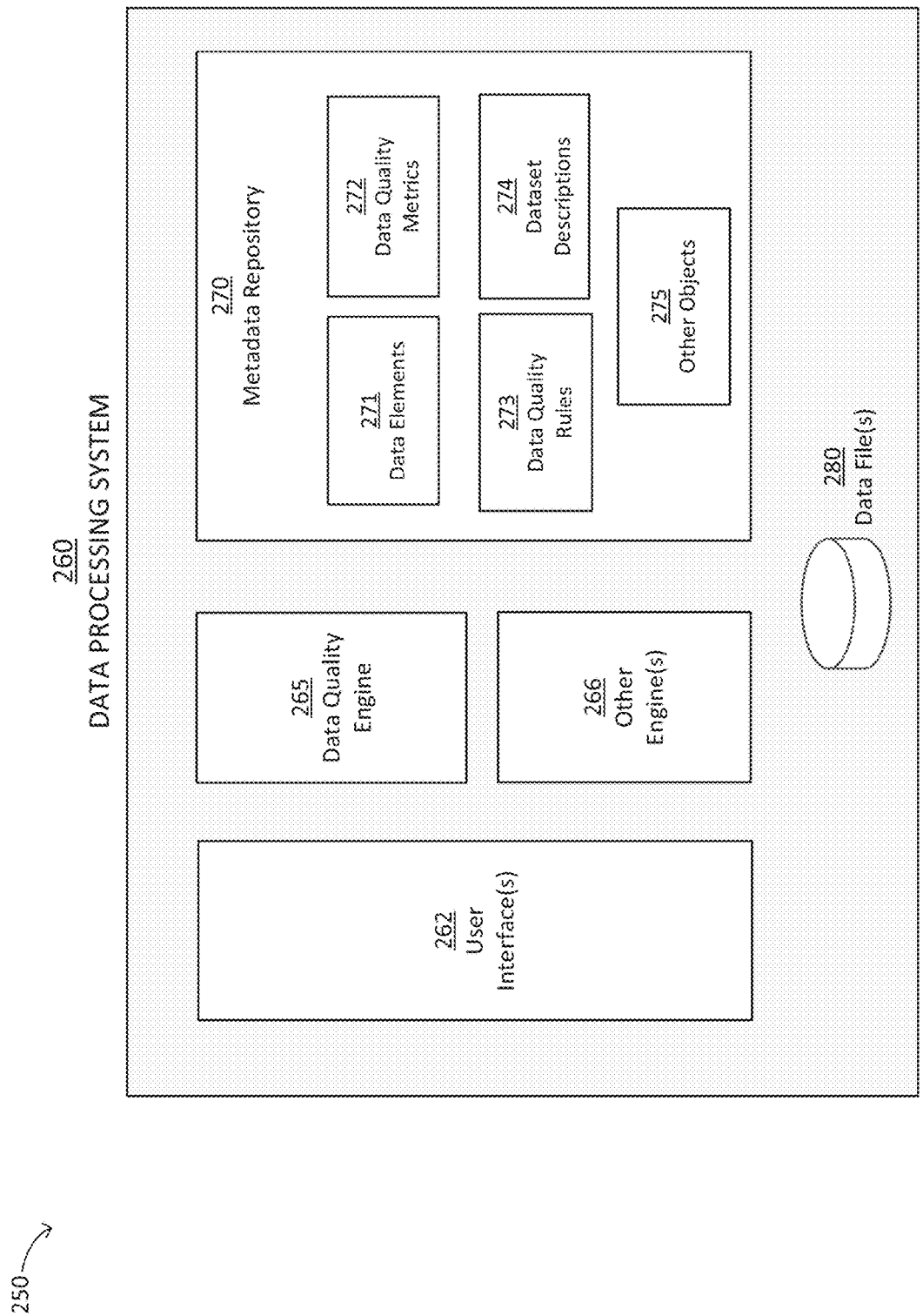
FIG. 2B depicts a block diagram of a data processing system on which aspects of the invention may be implemented, according to some embodiments.

FIG. 2B depicts a block diagram of a data processing system on which aspects of the invention may be implemented, according to some embodiments. Data processing system 260 includes data quality engine 265, other data processing engine(s) 266, one or more user interfaces 262, metadata repository 270 and data file(s) 280. The metadata repository 270 includes the types of objects depicted in metadata repository 210 shown in FIG. 2A in addition to one or more other types of objects 275.

In the example of FIG. 2B, the data quality engine 265 is configured to read and write data to/from metadata repository 270, and/or to perform data quality analysis as described herein. A user may interface with the data quality engine 265 via one or more of user interface(s) 262. For instance, a business analyst may access the data quality engine via a first user interface and create and/or modify data elements stored in the metadata repository via the first user interface, whereas a programmer may create and/or modify data quality rules within the metadata repository by accessing the data quality engine and/or other engines of the data processing system via a second user interface.

According to some embodiments, user interface(s) 262 may include a business oriented user interface. Controls within the user interface may be exposed to the business oriented user interface that allow the user to perform actions described herein as typically performed by a business user. For instance, the business oriented user interface may include functionality for defining one or more data elements and data quality metrics, and/or functionality for initiating data quality analysis by selecting a data element and/or a data quality metric previously created through the interface. The business oriented user interface may also expose tools that allow a business user to convey information on data quality requirements to a technical user. For instance, the interface may include text fields associated with a data element into which the business user may enter data quality requirements that the technical user subsequently views when creating data quality rules for that data element.

According to some embodiments, user interface(s) 262 may include a technical user interface. The technical user interface may expose controls that allow a user to perform actions described herein as typically being performed by a technical user. For instance, the interface may include controls for defining data quality rules (an example of which is provided below in relation to FIG. 5). The technical user interface may also present information on data quality requirements entered, for example, by a business user accessing the business oriented user interface described above.

Figure 3:
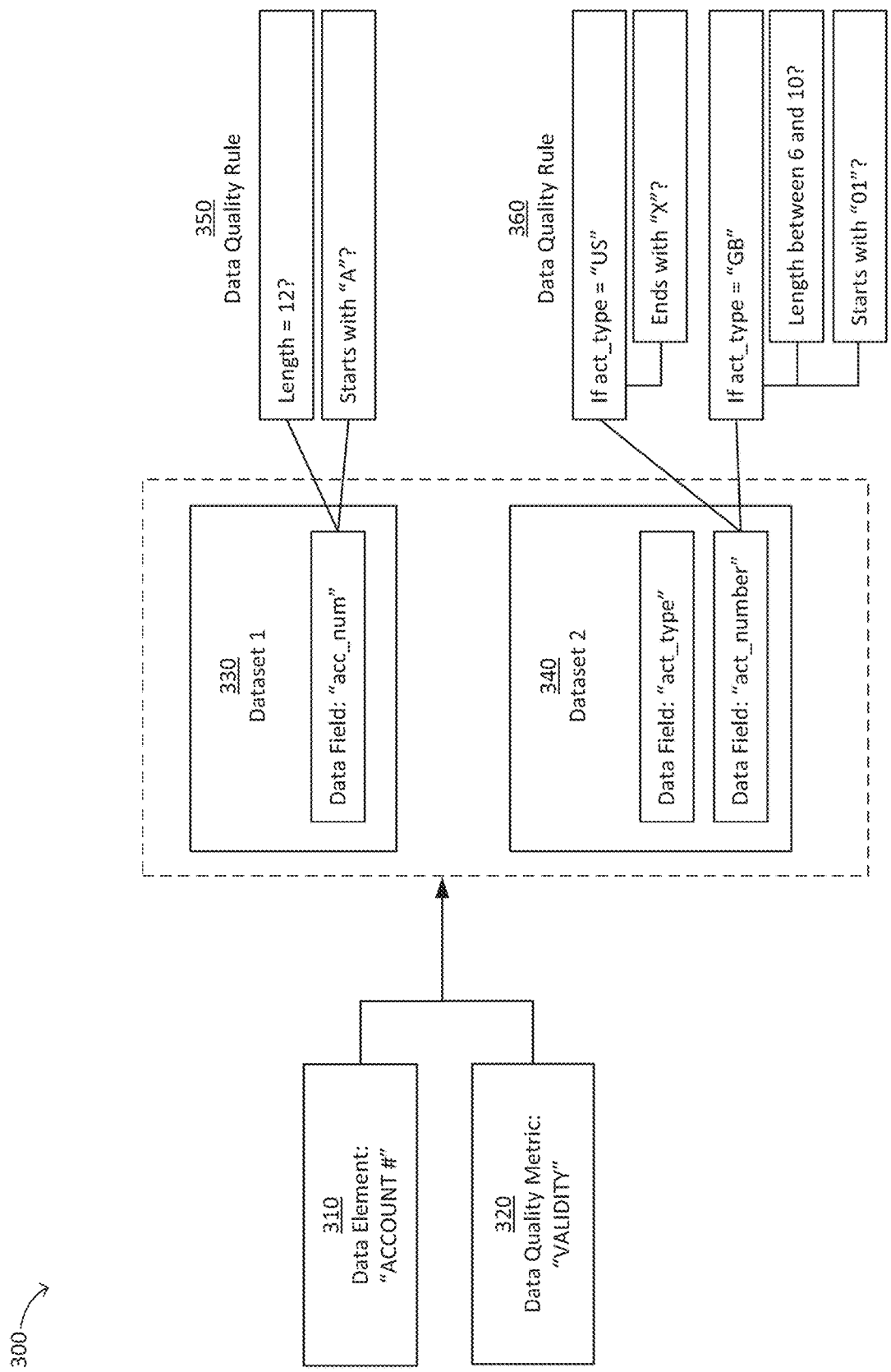
FIG. 3 depicts illustrative data quality rules associated with a single data element, a single data quality metric, and two data fields, according to some embodiments.

FIG. 3 depicts illustrative data quality rules associated with a single data element, a single data quality metric, and two data fields, according to some embodiments. In the example of FIG. 3, a number of data quality rules have been previously associated (e.g., by recording the associations within a metadata repository) with illustrative data element 310 and illustrative data quality metric 320. The elements depicted in FIG. 3 may be objects created within a data processing system and associations between objects may be stored, for example, in a metadata repository as described above.

As discussed above, in general more than one data quality metric may be associated with a single data element, however in the illustrative example of FIG. 3 only data quality rules associated with both the data element 310 and data quality metric 320 are depicted. The data quality rules illustrated in FIG. 3 may be stored in a metadata repository of a data processing system, as described above. Accordingly, a data quality engine performing a data quality analysis may access these illustrative rules to perform the analysis.

In the example of FIG. 3, the data processing system defines a data element 310 named "ACCOUNT #" and a data quality metric 320 named "VALIDITY." In this example, a business analyst may have created an association (e.g., in a metadata repository) between these objects with the intention that data quality rules to test the validity of all fields related to account number will be created (e.g., using the business oriented user interface described above). A technical user may have previously created these data quality rules within the data processing system and associated the rules with the data element and data quality metric (e.g., via the technical user interface described above).

In the example of FIG. 3, the data processing system includes two data fields that represent an account number: a data field "acc_num" within dataset 330 (which may include additional data fields not shown) and a data field "act_number" within dataset 340 (which may also include additional data fields not shown). Dataset 340 also includes a data field "act_type" that is referenced by the data quality rules that evaluate the "act_number" data field.

The data quality rule 350, as defined within the data processing system, is configured to evaluate the validity of the data field "acc_num" in dataset 330. The first element of the data quality rule determines whether the length of the "acc_num" data field is equal to 12, and the second element determines whether the "acc_num" data field begins with the character "A." If a data quality engine executing both of these queries on a value of the data field determines that both queries are true, the value passes the data quality rule. It will be appreciated that the illustrative data quality rule being discussed is depicted in a pseudocode fashion and will generally be written in a programmatic form of some kind and that the rules are depicted in FIG. 3 as pseudocode merely for clarity.

In the example of FIG. 3, the data processing system includes a data quality rule 350 configured to evaluate the validity of the data field "act_number" in dataset 340. This data quality rule references another data field of that dataset, "act_type," to determine how to evaluate the validity of "act_number." Specifically, if the "act_type" field has a value of "US," validity of the "act_number" data field turns on whether a value in that field ends with an "X" character. Alternatively, if the "act_type" field has a value of "GB," the validity of the "act_number" data field turns on whether the length of a value in the "act_number" data field has a length between 6 and 10 characters and begins with "01." In some cases, the data processing system may define the data quality rule 360 to have a default state of failure if the "act_type" data field has a value other than "US" or "GB."

Figure 4:
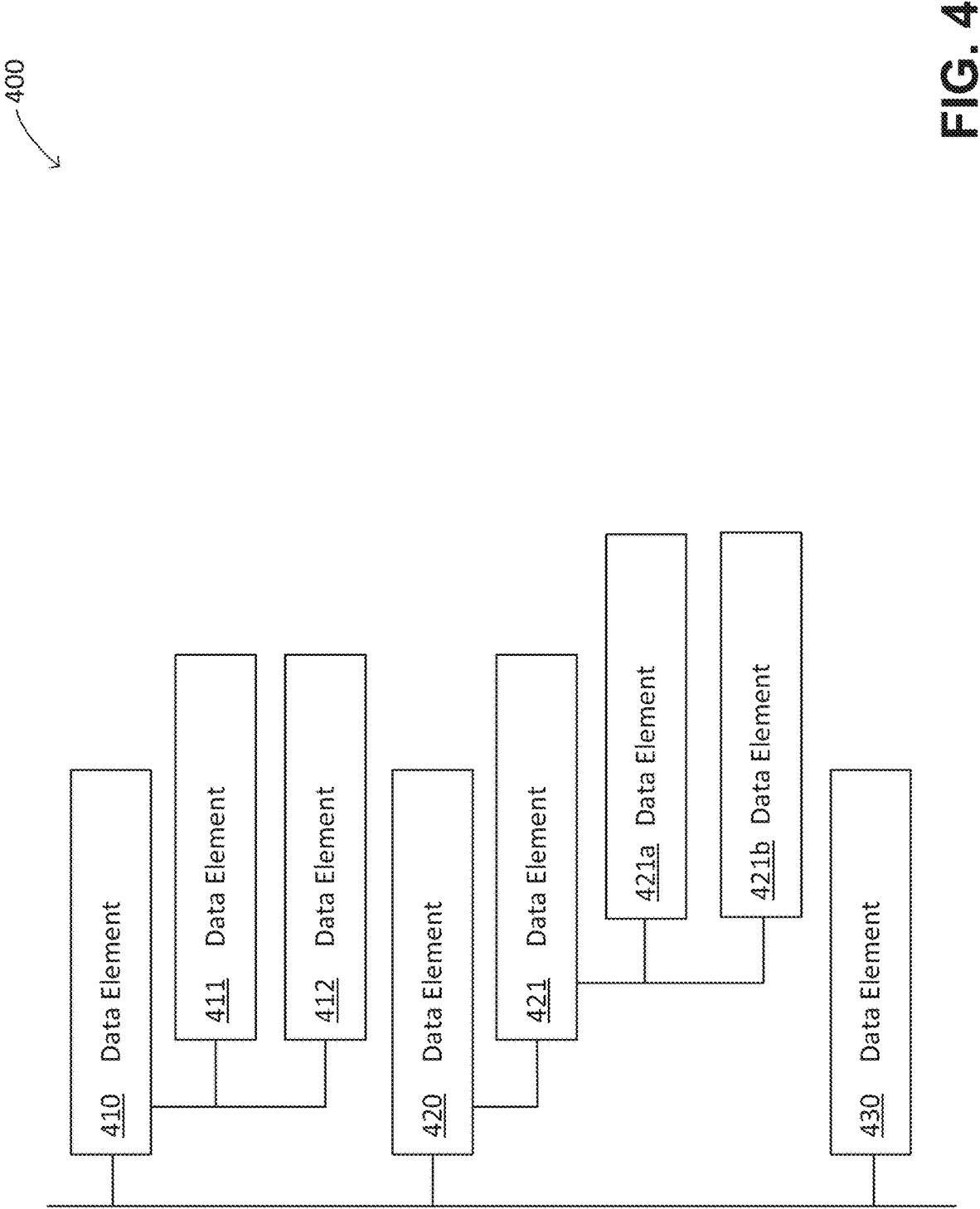
FIG. 4 depicts an illustrative hierarchy of data elements, according to some embodiments.

FIG. 4 depicts an illustrative hierarchy of data elements, according to some embodiments. As discussed above, data elements stored within a metadata repository (or otherwise) may be stored with associated information indicating hierarchical organization of the data elements.

In the example of FIG. 4, three data elements 410, 420 and 430 are located at a root level of a logical hierarchy of data elements. The position of these data elements in the hierarchy being at the root level may be stored within a metadata repository in any suitable way. Other data elements shown in FIG. 4, such as data elements 411 and 412, are at a second level below data element 410. In some cases, data elements within a second level may be stored with an indication of a parent data element (e.g., data elements 411 and 412 may have associated information that indicates that data element 410 is their parent data element). Alternatively, or additionally, data elements may be stored with an indication of a child data element (e.g., data element 410 may have associated information that indicates that data elements 411 and 412 are child data elements).

In some cases, folder structures may be stored in a hierarchy and data elements may be stored with an indication of a folder in which they reside. For example, a root folder may be created and a folder may be created as a child of the root folder. Data element 410 may be stored with an indication that it resides in the root folder, whereas data elements 411 and 412 may be stored with an indication that they reside in the folder that is a child of the root folder.

FIG. 5 depicts an illustrative user interface of a data processing system that may be used to define quality data rules, according to some embodiments. In the example of FIG. 5, the user interface provides a tabular view for a user to create and/or modify a data quality rule as a function of data fields of a dataset. A user interface structured in this way may provide a convenient way for a user to obtain a visual overview of a data quality rule and see how the rule is constructed and how it depends on various data fields. Such an interface may be, for example, utilized by a programmer to create and/or edit a data quality rule, and/or may be utilized by a business analyst to view a data quality rule. As discussed above, different types of users that access a data processing system may utilize different user interface(s) to perform data quality tasks within the system. The example of FIG. 5 is provided as one such illustrative interface, and may be presented to different users having different roles and/or permissions to create/edit/delete objects within the data processing system.

In the example of FIG. 5, table 500 depicts a data quality rule that performs numerous evaluations of four data fields. The "validation rule" columns are placeholders for expressions (labeled "rule expression") that are evaluated against the data fields in the respective row. For example, data field 1 is evaluated using two different expressions, whereas data field 2 is evaluated using a single rule expression, and data field 3 is not evaluated at all. In general any number of rule expressions may be created to be evaluated against any number of data fields to create a data quality rule. If any of the rule expressions generate a failure (e.g., a logical false), then the data quality rule is failed. It will be appreciated that other aspects of the user interface not shown in FIG. 5A may allow for the selection of which data field is registered as producing a failure and other aspects of configuring a data quality rule discussed herein.

Figure 6:
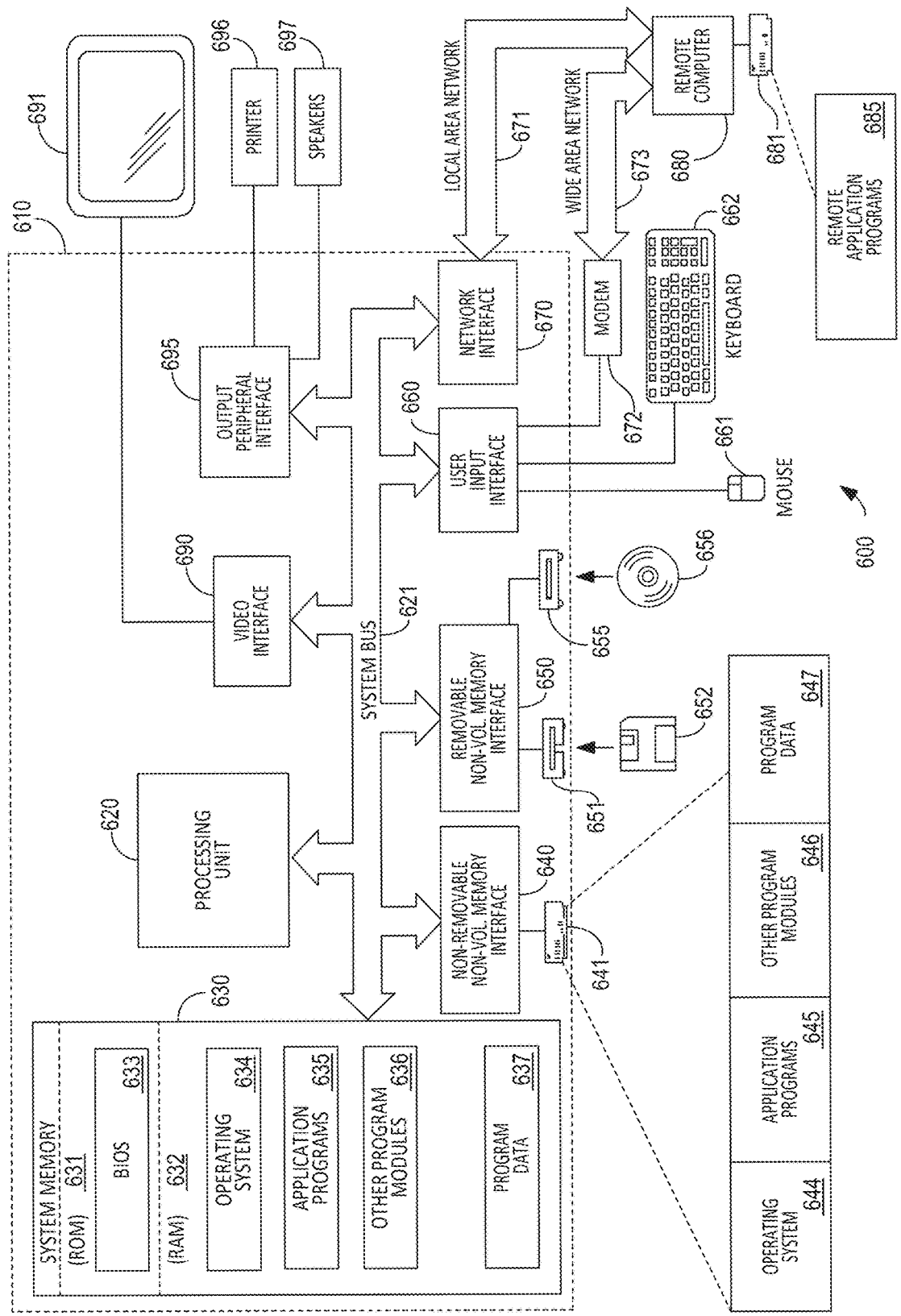
FIG. 6 illustrates an example of a computing system environment on which aspects of the invention may be implemented.

FIG. 6 illustrates an example of a suitable computing system environment 600 on which the technology described herein may be implemented. The computing system may be configured to receive natural language specification, receive data quality rules, store associations between data objects, etc. so that the computing system may perform the functions as described herein. The computing system environment 600 is only one example of a suitable computing environment and is not intended to suggest any limitation as to the scope of use or functionality of the technology described herein. Neither should the computing environment 600 be interpreted as having any dependency or requirement relating to any one or combination of components illustrated in the exemplary operating environment 600.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the technology described herein includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. For example, systems are described as being implemented with a metadata repository. As defined herein the system, and metadata repository, are implemented such that the system refers to relational links between data quality rules and other objects stored in the metadata repository. It is not a requirement, however, that a metadata repository is used to implement aspects of the present application. Any suitable system that stores data objects and stores links between the data objects may be utilized, which may for example include a suitable type of database.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Moreover, illustrative data quality rules as discussed herein are provided as having a particular granularity in terms of how many evaluation steps may be performed by a single data quality rule. It will be appreciated that data quality rules may be configured to include any number of evaluations, from a single logical comparison to a large number of evaluations, as the invention is not limited to a particular approach to configuring a data quality rule. In some cases, a lightweight data quality rule may be preferred to produce more indications of whether one or more data fields pass or fail data quality. In other cases, a more complex data quality rule that performs multiple evaluations may be preferred to produce fewer, yet more information-laden, indications of whether one or more data fields pass or fail data quality.

For example, when creating data quality rules to be associated with a "Validity" data quality metric, a programmer may opt in some cases to create a single data quality rule for a data field that checks all aspects of that data field's validity, though in other cases may opt to create multiple data quality rules that each check different aspects of the same data field's validity. In the latter case, more data quality results will be generated and each will reflect the data field's data validity in different ways, while the former approach will provide only a single data quality result that summarizes the data field's validity.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A data processing system comprising:
   at least one processor;
   at least one user interface; and
   at least one computer readable medium comprising processor-executable instructions that, when executed, cause the at least one processor to:
   identify one or more fields of one or more datasets via a checkpoint stored by the at least one computer readable medium and links stored by the at least one computer readable medium between the checkpoint and the one or more fields of the one or more datasets;
   perform a data quality analysis of the one or more fields of the one or more datasets by evaluating one or more data quality rules on the one or more fields to produce at least one measure of data quality; and
   display results of the data quality analysis with respect to a business term and a business data quality requirement by:
   identifying, by accessing one or more data structures stored by the at least one computer readable medium, a plurality of objects each linked to the one or more data quality rules, wherein links between the plurality of objects and the one or more data quality rules are defined by the one or more data structures, and wherein the plurality of objects includes:
   the business term; and
   the business data quality requirement, the business data quality requirement being associated with the business term; and
   displaying:
   the business term;
   the business data quality requirement;
   the at least one measure of data quality produced by the data quality analysis, wherein the at least one measure of data quality is indicative of a pass threshold, a failure threshold, or both a pass threshold and a failure threshold; and
   at least one indication why at least one data value from the one or more fields of the one or more datasets failed the data quality analysis.

2. The data processing system of claim 1, wherein the business data quality requirement includes one or more of: accuracy, completeness and validity.

3. The data processing system of claim 1, wherein the at least one measure of data quality is a score based on a count of data quality errors.

4. The data processing system of claim 1, wherein the at least one measure of data quality indicates a fraction of data values associated with the business term that passed one or more of the one or more data quality rules.

5. The data processing system of claim 1, wherein the at least one indication why the at least one data value failed the data quality analysis includes at least one error code associated with the business data quality requirement.

6. The data processing system of claim 1, wherein the instructions, when executed, further cause the at least one processor to initiate the data quality analysis at a designated date and/or time according to a schedule.

7. The data processing system of claim 1, wherein the instructions, when executed, further cause the at least one processor to, prior to performing the data quality analysis, identify the one or more data quality rules via links defined by the one or more data structures between the one or more fields of the one or more datasets and the one or more data quality rules.

8. The data processing system of claim 1, wherein the at least one measure of data quality includes a count of records in the one or more datasets that failed at least one data quality rule of the one or more data quality rules.

9. The data processing system of claim 1, wherein the instructions, when executed, further cause the at least one processor to define the checkpoint at least in part by receiving user input indicating a step within a business process.

10. At least one computer readable medium comprising processor-executable instructions that, when executed, cause at least one processor to:
    identify one or more fields of one or more datasets via a checkpoint stored by the at least one computer readable medium and links stored by the at least one computer readable medium between the checkpoint and the one or more fields of the one or more datasets;
    perform a data quality analysis of the one or more fields of the one or more datasets by evaluating one or more data quality rules on the one or more fields to produce at least one measure of data quality; and
    display results of the data quality analysis with respect to a business term and a business data quality requirement by:
    identifying, by accessing one or more data structures stored by the at least one computer readable medium, a plurality of objects each linked to the one or more data quality rules, wherein links between the plurality of objects and the one or more data quality rules are defined by the one or more data structures, and wherein the plurality of objects includes:
    the business term; and
    the business data quality requirement, the business data quality requirement being associated with the business term; and
    displaying:
    the business term;
    the business data quality requirement;
    the at least one measure of data quality produced by the data quality analysis wherein the at least one measure of data quality is indicative of a pass threshold, a failure threshold, or both a pass threshold and a failure threshold; and
    at least one indication why at least one data value from the one or more fields of the one or more datasets failed the data quality analysis.

11. The at least one computer readable medium of claim 10, wherein the business data quality requirement includes one or more of: accuracy, completeness and validity.

12. The at least one computer readable medium of claim 10, wherein the at least one measure of data quality is a score based on a count of data quality errors.

13. The at least one computer readable medium of claim 10, wherein the at least one measure of data quality indicates a fraction of data values associated with the business term that passed one or more of the one or more data quality rules.

14. The at least one computer readable medium of claim 10, wherein the at least one reason why the at least one data value failed the data quality analysis includes at least one error code associated with the business data quality requirement.

15. The at least one computer readable medium of claim 10, wherein the instructions, when executed, further cause the at least one processor to initiate the data quality analysis at a designated date and/or time according to a schedule.

16. The at least one computer readable medium of claim 10, wherein the instructions, when executed, further cause the at least one processor to, prior to performing the data quality analysis, identify the one or more data quality rules via links defined by the one or more data structures between the one or more fields of the one or more datasets and the one or more data quality rules.

17. The at least one computer readable medium of claim 10, wherein the at least one measure of data quality includes a count of records in the one or more datasets that failed at least one data quality rule of the one or more data quality rules.

18. The at least one computer readable medium of claim 10, wherein the instructions, when executed, further cause the at least one processor to define the checkpoint at least in part by receiving user input indicating a step within a business process.

\* \* \* \* \*